US010223205B2

(12) United States Patent
Clarke et al.

(10) Patent No.: US 10,223,205 B2
(45) Date of Patent: Mar. 5, 2019

(54) DISASTER RECOVERY DATA SYNC

(75) Inventors: Darrell Christopher Clarke, Vail, AZ (US); Kyle Barret Dudgeon, Vail, AZ (US); Miguel Angel Perez, Vail, AZ (US); David Charles Reed, Tucson, AZ (US); Max Douglas Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 989 days.

(21) Appl. No.: 12/354,741

(22) Filed: Jan. 15, 2009

(65) Prior Publication Data
US 2010/0185589 A1 Jul. 22, 2010

(51) Int. Cl.
G06F 17/30 (2006.01)
G06F 11/14 (2006.01)

(52) U.S. Cl.
CPC ...... G06F 11/1435 (2013.01); G06F 11/1469 (2013.01)

(58) Field of Classification Search
CPC ................. G06F 11/1435; G06F 11/1469
USPC .......................................... 707/691, 999.204
See application file for complete search history.

(56) References Cited

U.S. PATENT DOCUMENTS

| 5,930,824 A * | 7/1999 | Anglin et al. ........... 711/162 |
| 6,108,749 A * | 8/2000 | White ................. G06F 11/1466 711/111 |
| 6,119,208 A * | 9/2000 | White ................. G06F 11/1466 711/111 |
| 6,631,477 B1 * | 10/2003 | LeCrone ............ G06F 11/1456 711/162 |
| 7,158,999 B2 | 1/2007 | Pace et al. |
| 2005/0108485 A1 * | 5/2005 | Perego ................. G06F 3/0607 711/162 |
| 2005/0187990 A1 * | 8/2005 | Pace ................ G06F 17/30067 |
| 2007/0050269 A1 | 3/2007 | Choi et al. |
| 2007/0088769 A1 * | 4/2007 | Pace et al. .................... 707/204 |
| 2008/0109599 A1 | 5/2008 | Smith |

OTHER PUBLICATIONS

IBM, "MVS System Messages", 1999, vol. 5, pp. 114 and 353.*
(Continued)

Primary Examiner — Syling Yen
Assistant Examiner — Bao G Tran
(74) Attorney, Agent, or Firm — Griffiths & Seaton PLLC

(57) ABSTRACT

Various embodiments for failure recovery in a computing environment following a data restoration are provided. A catalog locate is performed for each of a plurality of data sets on a base catalog structure (BCS), identifying a plurality of BCS entries. If a first BCS entry is cataloged incorrectly, the first BCS entry is designated to be re-cataloged. The plurality of BCS entries is compared with a plurality of volume table of contents and a plurality of VSAM volume data set (VTOC/VVDS) entries. If a second BCS entry found in the plurality of BCS entries is not found in the plurality of VTOC/VVDS entries, and the second BCS entry indicates that a data set associated with the second BCS entry is located on a volume, an attempt is made to vary on the volume. If the volume cannot be varied on, a request is created to restore the volume.

8 Claims, 3 Drawing Sheets

(56) References Cited

OTHER PUBLICATIONS

IBM, "MVS JCL Reference", 2006, Eleventh Edition, 1$^{st}$ two pages of chapter 2.*
Lovelace et al, "ICF Catalog Backup and Recovery: Catalog RecoveryPlus Update", 2006, First Edition.*
IBM, "DFSMS Managing Catalogs", 2006, Sixth Edition, pp. 83-104.*
Ronald K. Ferguson, "Basic Concepts of ICF Catalog Backup and Recovery", 2003.*
Rogers et al, "ABCs of z/OS System Programming", 2007, vol. 3.*
IDC21364I Reference, IBM.*
Internal Disk Subsystem: Users Guide, Multiprise 3000 Interprise Server, IBM, First Edition, Nov. 1999.*

* cited by examiner

DISASTER RECOVERY DATA SYNC

BACKGROUND OF THE INVENTION

Field of the Invention

The present invention relates in general to computers, and more particularly to a method, system, and computer program product for failure recovery in a computing environment following a data restoration.

Description of the Related Art

The majority of businesses in the world today use computers and computer operating systems to store and manage information. The information stored in computer operating systems is typically organized into catalogs. Users may want to pass information from one catalog to another for several reasons. For example, the user might want to assign each division within a company its own catalog. Thus, the company would need to pass information associated with the division that is stored in the company catalog into a corresponding division catalog.

Catalogs are utilized to organize and locate data sets. A catalog in essence is a data set that contains information required to locate other data sets. A data set is often the fundamental unit of data storage and retrieval and typically consists of a collection of data in one of several prescribed arrangements. These arrangements are described by control information to which the computer operating system has access. A data set is a collection of logically related data records stored on a single external storage volume, or a set of volumes. A data set can be, for example, a source program, a library of macros, or a file of data records used by a processing program. A catalog does not have to be on the same volume(s) as the data sets the catalog describes. A catalog can refer to hundreds or thousands of data sets spread across many volumes.

Catalogs are sometimes structured in an integrated catalog facility (ICF). An ICF catalog may include two components. One component contains non-data-specific information, or the logical description, of a data set. The other component contains data-specific information, or the physical description, of a data set. Catalogs allow users to find and access a data set by name without knowing the exact location of the data set in memory storage. By cataloging data sets, users do not need to know about the storage setup.

Many users also set up their catalogs for specific recoverability in the event that information becomes lost or corrupted. Uncorrupted data would need to be transferred into the reformatted catalog to replace the corrupted data. After recovery of data in any type of failure, users may not know the state of all the data recovered, or if all the data needed is recovered. The only way users can absolutely verify that data or pointers to the data have been preserved is by execution of applications utilizing the data or pointers to the data. In most cases, this occurs too late to salvage data.

SUMMARY OF THE INVENTION

In light of the foregoing, a need exists for a mechanism following a failure recovery/data restoration to ensure data integrity for a user. In addition, a need exists for a mechanism to more effectively utilize the organizational benefits provided by catalog information by incorporating an analysis of catalog data with additional indexed data in the computing system, and by the integration of such analysis with additional existing recovery applications of the user.

Accordingly, in one embodiment, by way of example only, a method for failure recovery in a computing environment following a data restoration is provided. A catalog locate is performed for each of a plurality of data sets on a base catalog structure (BCS), identifying a plurality of BCS entries to ensure data is cataloged correctly. If a first BCS entry of the plurality of BCS entries is determined to be cataloged incorrectly, the first BCS entry is designated to be re-cataloged. The plurality of BCS entries with a plurality of volume table of contents and a plurality of VSAM volume data set (VTOC/VVDS) entries. If a second BCS entry found in the plurality of BCS entries is not found in the plurality of VTOC/VVDS entries, and the second BCS entry indicates that a data set associated with the second BCS entry is located on a volume, an attempt is made to vary on the volume. If the volume cannot be varied on, a request is created to restore the volume.

In an additional embodiment, a system for failure recovery in a computing environment following a data restoration is provided. A processor device is in communication with a storage device. The processor device is adapted for performing a catalog locate for each of a plurality of data sets on a base catalog structure (BCS), identifying a plurality of BCS entries to ensure data is cataloged correctly. If a first BCS entry of the plurality of BCS entries is determined to be cataloged incorrectly, the first BCS entry is designated to be re-cataloged. The plurality of BCS entries with a plurality of volume table of contents and a plurality of VSAM volume data set (VTOC/VVDS) entries. If a second BCS entry found in the plurality of BCS entries is not found in the plurality of VTOC/VVDS entries, and the second BCS entry indicates that a data set associated with the second BCS entry is located on a volume, an attempt is made to vary on the volume. If the volume cannot be varied on, a request is created to restore the volume.

In an additional embodiment, again by way of example only, a computer program product for failure recovery in a computing environment following a data restoration is provided. The computer program product comprises a computer-readable storage medium having computer-readable program code portions stored therein. The computer-readable program code portions comprise a first executable portion for performing a catalog locate for each of a plurality of data sets on a base catalog structure (BCS), identifying a plurality of BCS entries to ensure data is cataloged correctly. If a first BCS entry of the plurality of BCS entries is determined to be cataloged incorrectly, the first BCS entry is designated to be re-cataloged. The plurality of BCS entries with a plurality of volume table of contents and a plurality of VSAM volume data set (VTOC/VVDS) entries. If a second BCS entry found in the plurality of BCS entries is not found in the plurality of VTOC/VVDS entries, and the second BCS entry indicates that a data set associated with the second BCS entry is located on a volume, an attempt is made to vary on the volume. If the volume cannot be varied on, a request is created to restore the volume.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for failure recovery following a data restoration in a computing environment. These embodiments leverage a variety of available resources in the computing environment, including existing backup recovery products, to verify data in the environment. For example, the embodiments analyze information in all online system catalogs, volume table of contents (VTOC) information, virtual volume data set (VVDS) information, and physical volume information to ensure that each of the resources are in sync with each other.

Figure 1:
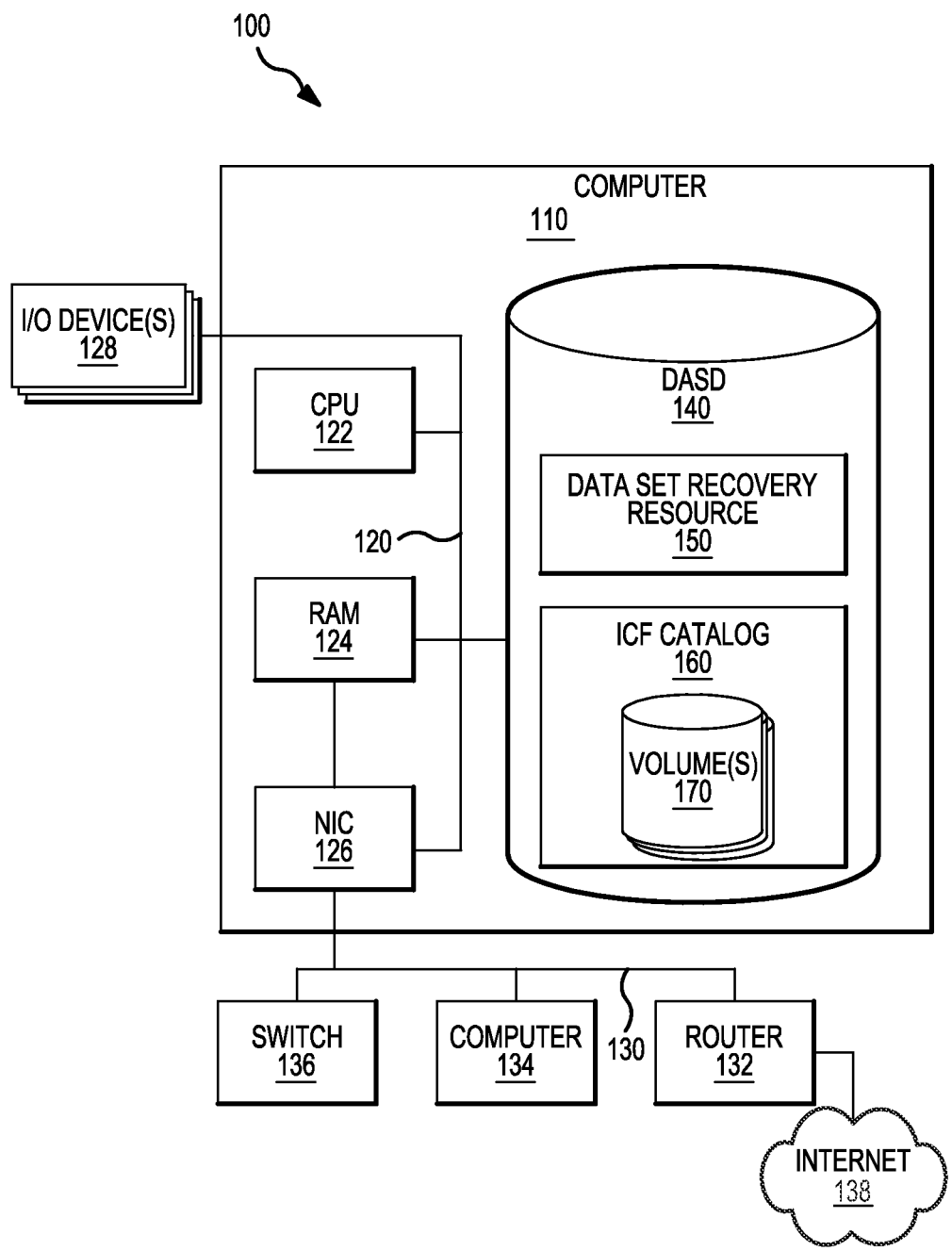
FIG. 1 is an exemplary computing environment.

FIG. 1 depicts one embodiment of a computer system for failure recovery following a data restoration in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
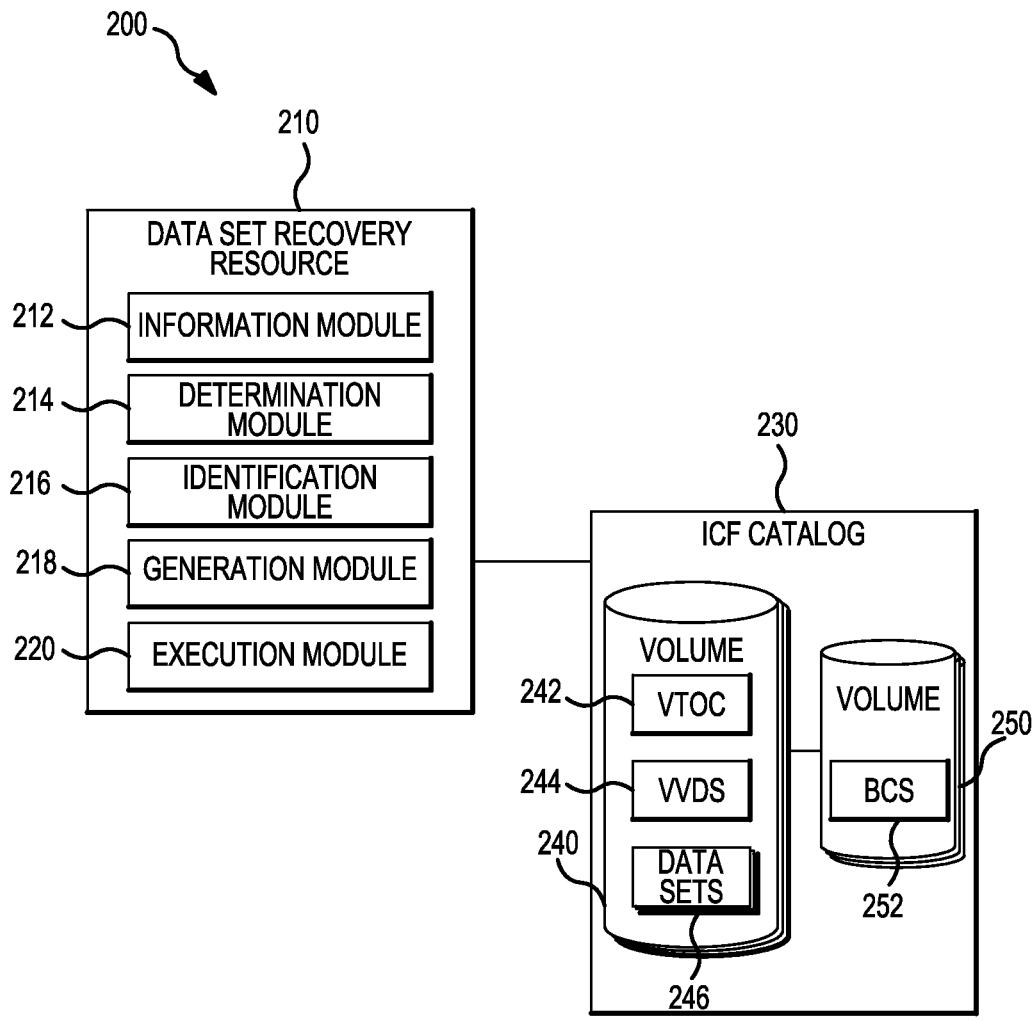
FIG. 2 is an exemplary data set recovery resource.

FIG. 2 depicts one embodiment of a DASD environment comprising a data set recovery resource and an integrated catalog facility (ICF) catalog in accordance with the present invention. The DASD environment 200 includes a data set recovery resource 210, an information module 212, a determination module 214, an identification module 216, a generation module 218, an execution module 220, an integrated catalog facility (ICF) catalog 230, a volume 240, a volume table of contents (VTOC) 242, a VSAM volume data set (VVDS) 244, data sets 246, a volume 250, and a basic catalog structure (BCS) 252.

In the depicted embodiment, the data set recovery resource 210 includes the information module 212, the determination module 214, the identification module 216, the generation module 218, and the execution module 220. The data set recovery resource 210 may execute the preceding modules. In one embodiment, the data set recovery resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed.

Other information retrieved by the information module may include a data set name, catalog status, the type entry in the catalog such as the type of data set or the VSAM index of a VSAM data set, or associated data set names if applicable. The information retrieved may further include identification of data sets to bypass during the recovery.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 214 determines one or more recovery operations to perform. The determination module 214 may VTOC and/or VVDS information to determine the one or more recovery operations to perform. The determination module 214 may use the information obtained from the information module 212 for further determination in the data set recovery resource 210.

The identification module 216 may identify related data sets by using an association identifier. The association identifier may be included with the information retrieved from the information module 212. The association identifier may be a name of a cluster of data sets.

In one embodiment, the generation module 218 generates one or more control statements for performing one or more recovery operations on the data sets 246. The control statements may be run by a plurality of utilities which require syntactically different control statements; in this situation, the control statements must be generated to be executed by a selected utility. The type of data set being maintained may determine the utility to generate control statements for. In one embodiment, the determination module 214 determines what recovery operations to perform on the data sets 246. The generation module 218 may generate control statements based on the determination of the recovery operations to perform by the determination module 214 as will be further described.

The execution module 220 executes the one or more generated control statements to perform recovery operations on the data sets 246. In one embodiment, the execution module 220 selects a utility or a preexisting recovery application to execute the generated control statement with. Selecting a utility may be based on the type of data set to be processed. In another embodiment, selecting a utility is based on the syntax of the control statement.

One utility that may be used by the execution module 220 is IDCAMS. IDCAMS is a utility used to create, delete, rename, catalog, or uncatalog data sets. IDCAMS may also be used to manage catalogs. Another utility that may be used by the execution module 220 is IEHPROGM. IEHPROGM is a utility that provides facilities for deleting or renaming data sets and for cataloging or uncataloging non-VSAM data sets. Still another utility that may be used by the execution module 220 is VSAM Examine. VSAM Examine is a verification tool for VSAM data sets.

The execution module 220 may not be limited to using just IDCAMS, IEHPROGM, or VSAM Examine. As previously explained above, execution module 220 may also be utilized for existing backup/recover products, such as hierarchical storage management (HSM). In one embodiment, the execution module 220 uses any utility or backup/recovery product capable of performing the desired recovery operations as will be described.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140. The data set recovery resource 210 may act on the ICF catalog 230 and its components to perform recovery and data sync operations.

The data set recovery resource 210 utilizes the VTOC 242 to obtain information about volume 240 and data sets 246. The VTOC 242 may store certain information regarding data sets such as data set attributes and a description, which may include size, location, and extent information. The VVDS 244 may also be used by the data set recovery resource 210 to obtain information regarding data sets 246.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may also be used by the data set recovery resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents; the relationship between the BCS 252, VVDS 244, and VTOC 242 is not exclusive.

The following methodology may be implemented by the data set recovery module 210 following a failure recovery and data restoration to verify data and sync information. As a preliminary matter, however, before the failure occurs, a user may complete a configuration file. The configuration file may include which device(s) to perform the following methodology on, and what existing backup/recovery products were available for use. For example, if HSM is available as a recovery product, the user would indicate such on the configuration file.

As a next step, each of the VTOC and VVDS entries for all online volumes are collected. The information in each is compared to determine that data sets are listed, and the data sets are consistent between the VTOC and VVDS entries. For example, the number of extents associated with the VTOC entries is compared against the number of extents associated with the VVDS entries to ensure data consistency.

Input/Output (I/O) may then be performed to the volume to ensure that data exists on the volume and is readable. A channel command word (CCW) may be built to perform I/O to the data set(s) and ensure the data set(s) represented by the VTOC/VVDS entries is available. In one embodiment, the block size information found in the VTOC may be used to build the CCW. An additional verification of the data may be made using an existing verification tool such as VSAM Examine.

A catalog locate may then be performed for each data set to ensure data is cataloged correctly. If a data set is not cataloged correctly it is kept on the list to be cataloged in the final step. All system catalogs may then be scanned, where each entry is compared with the list of data sets obtained pursuant to the catalog locate previously. If no locate was issued, no VTOC entry exists for the data set. If an entry indicates the data set is associated with a DASD volume, then a conclusion may be made that the volume is potentially missing or offline. If the volume cannot be varied-on, and is determined to be a missing volume, then a request may be created to restore the volume. Once the volume is restored, then each catalog may be analyzed again to ensure that the restored data sets are complete.

Data set(s) not catalogued previously may be cataloged. Remaining errors may be due to incomplete data. Accordingly, a report may be generated with a list of data set(s) needing to be deleted and recovered due to various remaining inconsistencies. If an existing backup/recovery product such as HSM is available, it may be used to delete and recover the data sets in question. Incomplete portions may be deleted and a request may be generated to recover the individual data sets using the existing backup/recovery product.

The diagram that follows is generally set forth as a logic flow diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. The order in which particular steps occur may or may not strictly adhere to the order of the corresponding steps shown.

Figure 3:
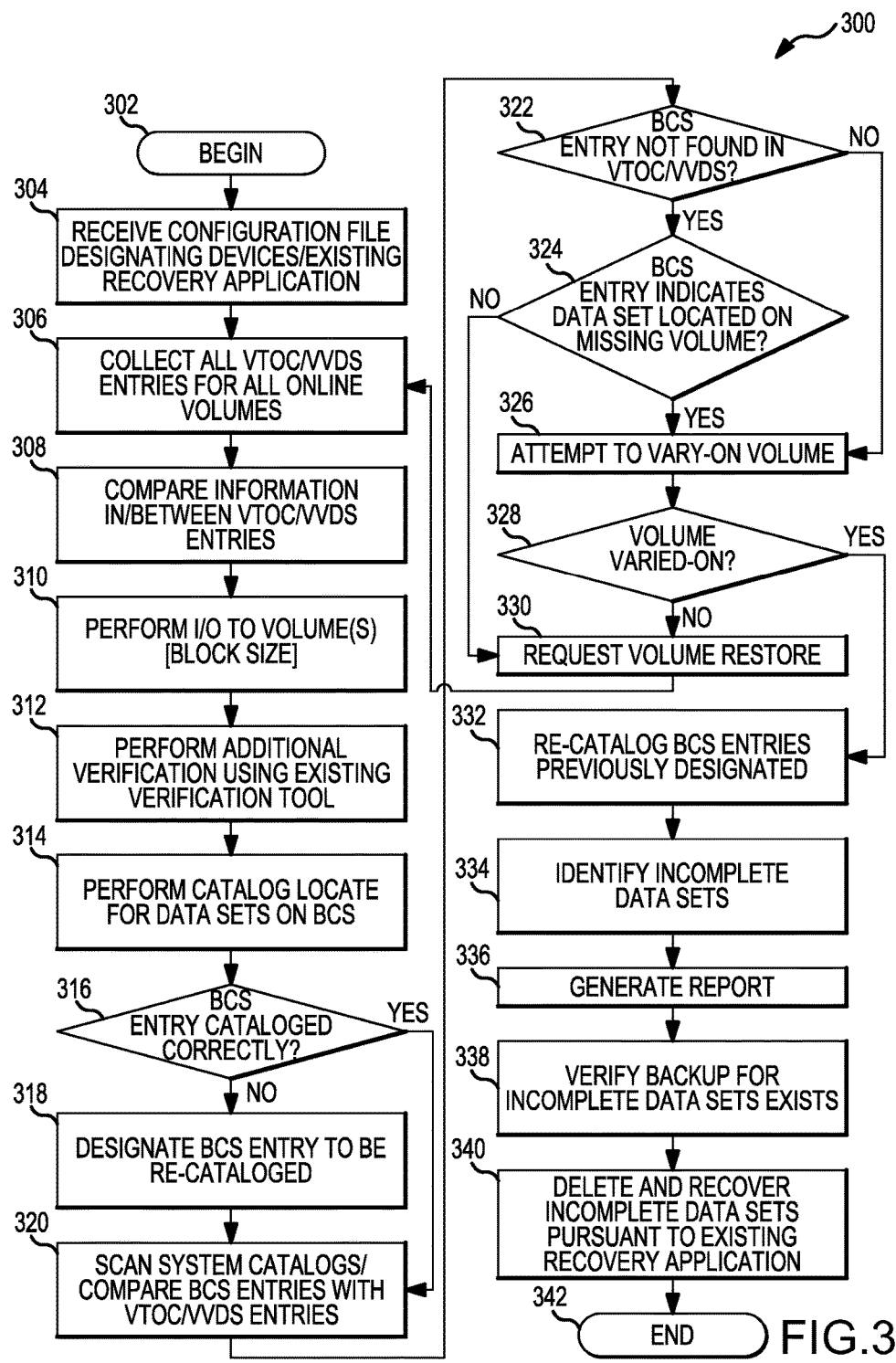
FIG. 3 is a flow chart diagram of an exemplary method for failure recovery following a data restoration in a computing environment.

Turning to FIG. 3, a logic flow diagram of an exemplary method 300 for performing failure recovery following a data restoration in a computer environment is depicted. As one skilled in the art will appreciate, the described method may be implemented by various means, such as hardware, software, firmware, or a combination thereof operational on or otherwise associated with the computer environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) with the receipt of a configuration file designating device(s) and existing backup/recovery applications as previously described (step 304). Here again, the configuration file is populated by a user in advance of a computer failure. Later, following the failure and data recovery, all VTOC and VVDS entries for all online volumes are collected (step 306). Information in and between the VTOC/VVDS entries are examined and compared (step 308).

Control moves to step 310, where I/O is performed to a volume(s) under analysis (such as construction of a CCW using block size information as previously described). Additional data verification may then be performed using an existing verification tool such as VSAM Examine (step 312). As a next step, a catalog locate is performed for data sets on the BCS (step 314). If the BCS entries are determined to be cataloged correctly (step 316), control moves to step 320. If the BCS are not determined to be cataloged correctly (again, step 316), the BCS entries are designated to be later re-cataloged (step 318).

At step 320, the system catalogs are then scanned, where the VTOC/VVDS entries are compared against the BCS entries (step 320). If the BCS entry is not found in the VTOC and/or VVDS entries (step 322), and the BCS entry indicates the data set is located on a missing volume (step 324), the an attempt is made to vary-on the volume (step 326) If the volume is varied-on (step 328), then control moves to step 332. If the volume cannot be varied-on (again, step 328), then a volume restore request is made for the volume (step 330), and the method 300 returns to step 306 to perform an additional recovery steps (steps 306-320) to ensure the volume/data sets have been restored.

At step 332, BCS entries previously designated to be re-cataloged are re-cataloged. Any remaining errors indicate incomplete data sets, which are identified (step 334). A report is generated listing these incomplete data sets (step 336). A backup for the incomplete data sets is verified (step 338), and the incomplete data sets are deleted and recovered pursuant to an existing backup/recovery program such as HSM described above (step 340). Method 300 then ends (step 342).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for failure recovery in a computing environment following a data restoration, the method comprising:
   (a) performing a catalog locate for each of a plurality of data sets on a base catalog structure (BCS), identifying a plurality of BCS entries to ensure data is cataloged correctly, wherein if a first BCS entry of the plurality of BCS entries is determined to be cataloged incorrectly, the first BCS entry is designated to be re-cataloged;
   (b) comparing the plurality of BCS entries with a plurality of volume table of contents (VTOC) and a plurality of virtual storage access method (VSAM) volume data set (VVDS) entries, wherein if a second BCS entry found in the plurality of BCS entries is not found in the plurality of VTOC/VVDS entries, and the second BCS entry indicates that a data set associated with the second BCS entry is located on a volume, an attempt is made to vary on the volume, wherein if the volume cannot be varied on, a request is created to restore the volume;

(c) performing input/output (I/O) to the volume using a created channel command word (CCW), and each of a plurality of additional volumes associated with the VTOC/VVDS entries, to ensure the data is available and readable, wherein block size information found in the VTOC entries are used to build the CCW, and wherein, subsequent to performing the I/O using the CCW to ensure the data is available and readable, performing an additional verification of the data using a VSAM Examine command;

(d) collecting each of the plurality of VTOC/VVDS entries;

(e) comparing information in and between each of the plurality of VTOC/VVDS entries to determine if the data is consistent between the VTOC entries and the VVDS entries by comparing a number of extents associated with the VTOC entries with a number of extents associated with the VVDS entries;

receiving a configuration file populated by a user, the configuration file designating at least one storage device for analysis and at least one existing recovery application;

identifying incomplete data sets associated with the VTOC/VVDS entries, the incomplete data sets determined by remaining errors after each of the plurality of BCS entries designated to be re-cataloged are re-cataloged;

generating a report containing the incomplete data sets;

verifying that a backup for the incomplete data sets exists; and deleting and recovering the incomplete data sets pursuant to an existing recovery application.

2. The method of claim 1, further including, subsequent to step (c), performing a data verification using an existing verification tool.

3. The method of claim 1, further including, subsequent to creating the request to restore the volume, re-performing steps (d), (e), (c), and (a) to ensure the data is correct.

4. A system for failure recovery in a computing environment following a data restoration, comprising:

a processor device in communication with a storage device, wherein the processor device performs each of:

(a) performing a catalog locate for each of a plurality of data sets on a base catalog structure (BCS), identifying a plurality of BCS entries to ensure data is cataloged correctly, wherein if a first BCS entry of the plurality of BCS entries is determined to be cataloged incorrectly, the first BCS entry is designated to be re-cataloged, (b) comparing the plurality of BCS entries with a plurality of volume table of contents (VTOC) and a plurality of virtual storage access method (VSAM) volume data set (VVDS) entries, wherein if a second BCS entry found in the plurality of BCS entries is not found in the plurality of VTOC/VVDS entries, and the second BCS entry indicates that a data set associated with the second BCS entry is located on a volume, an attempt is made to vary on the volume, wherein if the volume cannot be varied on, a request is created to restore the volume, (c) performing input/output (I/O) to the volume using a created channel command word (CCW), and each of a plurality of additional volumes associated with the VTOC/VVDS entries, to ensure the data is available and readable, wherein block size information found in the VTOC entries are used to build the CCW, and wherein, subsequent to performing the I/O using the CCW to ensure the data is available and readable, performing an additional verification of the data using a VSAM Examine command, (d) collecting each of the plurality of VTOC/VVDS entries, (e) comparing information in and between each of the plurality of VTOC/VVDS entries to determine if the data is consistent between the VTOC entries and the VVDS entries by comparing a number of extents associated with the VTOC entries with a number of extents associated with the VVDS entries, receiving a configuration file populated by a user, the configuration file designating at least one storage device for analysis and at least one existing recovery application, identifying incomplete data sets associated with the VTOC/VVDS entries, the incomplete data sets determined by remaining errors after each of the plurality of BCS entries designated to be re-cataloged are re-cataloged, generating a report containing the incomplete data sets, verifying that a backup for the incomplete data sets exists, and deleting and recovering the incomplete data sets pursuant to an existing recovery application.

5. The system of claim 4, wherein the processor device, subsequent to step (c), performs a data verification using an existing verification tool.

6. The system of claim 4, wherein the processor device, subsequent to creating the request to restore the volume, re-performs steps (d), (e), (c), and (a) to ensure the data is correct.

7. A computer program product for failure recovery in a computing environment following a data restoration, the computer program product comprising a non-transitory computer-readable storage medium having computer-readable program code portions stored therein, the computer-readable program code portions comprising:

a first executable portion that performs each of:

(a) performing a catalog locate for each of a plurality of data sets on a base catalog structure (BCS), identifying a plurality of BCS entries to ensure data is cataloged correctly, wherein if a first BCS entry of the plurality of BCS entries is determined to be cataloged incorrectly, the first BCS entry is designated to be re-cataloged, (b) comparing the plurality of BCS entries with a plurality of volume table of contents (VTOC) and a plurality of virtual storage access method (VSAM) volume data set (VVDS) entries, wherein if a second BCS entry found in the plurality of BCS entries is not found in the plurality of VTOC/VVDS entries, and the second BCS entry indicates that a data set associated with the second BCS entry is located on a volume, an attempt is made to vary on the volume, wherein if the volume cannot be varied on, a request is created to restore the volume, (c) performing input/output (I/O) to the volume using a created channel command word (CCW), and each of a plurality of additional volumes associated with the VTOC/VVDS entries, to ensure the data is available and readable, wherein block size information found in the VTOC entries are used to build the CCW, and wherein, subsequent to performing the I/O using the CCW to ensure the data is available and readable, performing an additional verification of the data using a VSAM Examine command, (d) collecting each of the plurality of VTOC/VVDS entries, (e) comparing information in and between each of the plurality of VTOC/VVDS entries to determine if the data is consistent between the VTOC entries and the VVDS entries by comparing a number of extents associated with the VTOC entries with a number of extents associated with the VVDS entries, receiving a configuration file populated by a user, the configuration file designating at least one storage device for analysis and at least one existing recovery application, identifying incomplete data sets associated with the VTOC/VVDS entries, the incomplete data sets determined by remaining errors after each of the plurality of BCS entries designated to be re-cataloged are re-cataloged, generating a report containing the incomplete data sets, verifying that a backup for the incomplete data sets exists, and deleting and recovering the incomplete data sets pursuant to an existing recovery application.

8. The computer program product of claim 7, further including a second executable portion that, subsequent to creating the request to restore the volume, re-performs steps (d), (e), (c), and (a) to ensure the data is correct.

\* \* \* \* \*